United States Patent
Oodachi et al.

(10) Patent No.: US 8,095,159 B2
(45) Date of Patent: Jan. 10, 2012

(54) RADIO POWER-FED TERMINAL, SYSTEM, AND METHOD

(75) Inventors: Noriaki Oodachi, Kawasaki (JP); Hiroki Inagaki, Kawasaki (JP); Shoji Ootaka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 514 days.

(21) Appl. No.: 12/369,857

(22) Filed: Feb. 12, 2009

(65) Prior Publication Data
US 2009/0247199 A1    Oct. 1, 2009

(30) Foreign Application Priority Data
Mar. 27, 2008   (JP) .................................. 2008-083432

(51) Int. Cl.
*H04B 7/00* (2006.01)
*H04B 17/00* (2006.01)
(52) U.S. Cl. ...................... 455/500; 455/62; 455/67.11
(58) Field of Classification Search .................. 455/67, 455/500
See application file for complete search history.

(56) References Cited

U.S. PATENT DOCUMENTS

| 7,209,842 B2 * | 4/2007 | Mizuno et al. ................ 702/64 |
| 2007/0042729 A1 * | 2/2007 | Baaman et al. ............ 455/127.1 |
| 2008/0309452 A1 * | 12/2008 | Zeine ........................... 340/5.1 |

FOREIGN PATENT DOCUMENTS

| JP | 2004-127276 | 4/2004 |
| JP | 2007-88940 | 4/2007 |

* cited by examiner

*Primary Examiner* — James H Cho
(74) *Attorney, Agent, or Firm* — Finnegan, Henderson, Farabow, Garrett & Dunner, L.L.P.

(57) ABSTRACT

A power-fed terminal includes a first reception unit receiving, from another terminal, first information containing at least one frequency candidate that fails to be used by any other communication system, the frequency candidate being used for transmitting a first microwave, a second reception unit receiving the first microwave transmitted by the another terminal using the frequency candidate, a conversion unit converts an energy of the first microwave into a first DC energy, a transmission unit transmitting, to the another terminal, second information containing an optimum frequency corresponding to a maximum energy of the first DC energy, wherein the second reception unit receives a second microwave transmitted based on the second information by the another terminal, the conversion unit converts an energy of the second microwave into a second DC energy, the terminal further includes a secondary cell acquiring the second DC energy at the optimum frequency.

14 Claims, 5 Drawing Sheets

RADIO POWER-FED TERMINAL, SYSTEM, AND METHOD

CROSS-REFERENCE TO RELATED APPLICATIONS

This application is based upon and claims the benefit of priority from prior Japanese Patent Application No. 2008-083432, filed Mar. 27, 2008, the entire contents of which are incorporated herein by reference.

BACKGROUND OF THE INVENTION

1. Field of the Invention

The present invention relates to a radio power supply technique and, more particularly, to a radio power-fed terminal, system, and method concerning a method of selecting a frequency to be used for radio power supply.

2. Description of the Related Art

A radio power supply system has been known, which comprises a microwave transmission terminal for radio power supply including a microwave transmission unit and a radio communication unit, and a power-fed terminal which includes a radio power supply unit and a radio communication unit and wirelessly receives power. Use of this system enables information transmission/reception and radio power supply (wireless transmission) of energy (JP-A 2004-127276 (KOKAI)).

The conventional radio power supply system performs radio power supply using a microwave having a specific frequency. For example, when a frequency of 2.4 GHz in the ISM band is used, it may interfere with radio communication of, e.g., wireless LAN. The number of frequencies available in radio communication is finite, and many frequencies are already assigned for radio communication. It is therefore difficult to ensure a frequency for radio power supply.

To ensure a frequency, a cognitive wireless technique has been developed. In cognitive radio communication, it is detected whether an already assigned frequency is being used or not. Radio communication is performed using an available frequency that is not being used. This reduces interference with radio communication.

The cognitive radio communication technique may be applied to radio power supply. If there are a plurality of available frequencies, a frequency optimum for radio power supply must be selected. However, no method has been disclosed so far.

The conventional radio power supply system performs radio power supply using a microwave having a specific frequency, as described above, and this may cause interference with radio communication. Although an available frequency may be used, the problem of the method of selecting a frequency optimum for radio power supply still remains unsolved.

BRIEF SUMMARY OF THE INVENTION

In accordance with an aspect of the invention, there is provided a power-fed terminal comprising: a first reception unit configured to receive, from another terminal, first information containing at least one frequency candidate that fails to be used by any other communication system, the frequency candidate being used for transmitting a first microwave; a second reception unit configured to receive the first microwave transmitted by the another terminal using the frequency candidate; a conversion unit configured to convert an energy of the first microwave into a first DC energy; and a transmission unit configured to transmit, to the another terminal, second information containing an optimum frequency corresponding to a maximum energy of the first DC energy, wherein the second reception unit is configured to receive a second microwave transmitted based on the second information by the another terminal, the conversion unit is configured to convert an energy of the second microwave into a second DC energy, the terminal further comprising a secondary cell acquiring the second DC energy at the optimum frequency.

In accordance with another aspect of the invention, there is provided a power-fed terminal comprising: a first reception unit configured to receive, from another terminal, first information containing at least one frequency candidate that fails to be used by any other communication system, the frequency candidate being used for transmitting a first microwave; a second reception unit configured to receive the first microwave transmitted by the another terminal using the frequency candidate; a conversion unit configured to convert an energy of the first microwave into a first DC current; a measuring unit configured to measure a current value of the first DC current for each frequency candidate to obtain a plurality of measured current values; a selection unit configured to select an optimum frequency corresponding to a maximum current value of the measured current values from the at least one frequency candidate; and a transmission unit configured to transmit second information containing the optimum frequency to the another terminal, wherein the second reception unit is configured to receive a second microwave transmitted based on the second information by the another terminal, the conversion unit is configured to convert an energy of the second microwave into a second DC energy, the terminal further comprising a secondary cell acquiring the second DC current at the optimum frequency.

In accordance with yet another aspect of the invention, there is provided a radio power supply system including a first terminal which requests another terminal to supply power, and a second terminal which receives the request from the first terminal and transmits a microwave to the first terminal, the second terminal comprising: a first selection unit configured to select at least one frequency candidate that fails to be used by any other communication system, the frequency candidate being used for transmitting a first microwave; a first transmission unit configured to transmit first information containing the frequency candidate to the first terminal; and a second transmission unit configured to transmit the first microwave to the first terminal by using the frequency candidate, the first terminal comprising: a first reception unit configured to receive the first information; a second reception unit configured to receive the first microwave using the frequency candidate contained in the first information; a conversion unit configured to convert the first microwave into a first DC current; a measuring unit configured to measure a current value of the first DC current for each frequency candidate to obtain a plurality of measured current values; a second selection unit configured to select an optimum frequency corresponding to a maximum current value of the measured current values from the at least one frequency candidate; and a third transmission unit configured to transmit second information containing the optimum frequency to the second terminal, the second terminal further comprising a third reception unit configured to receive the second information, wherein the second transmission unit is configured to transmit a second microwave to the first terminal by using the optimum frequency contained in the second information, the second reception unit is configured to receive the second microwave, the conversion unit is configured to convert an energy of the second microwave into a second DC energy, the first terminal further comprising a secondary cell acquiring the second DC current at the optimum frequency.

DETAILED DESCRIPTION OF THE INVENTION

Figure 1:
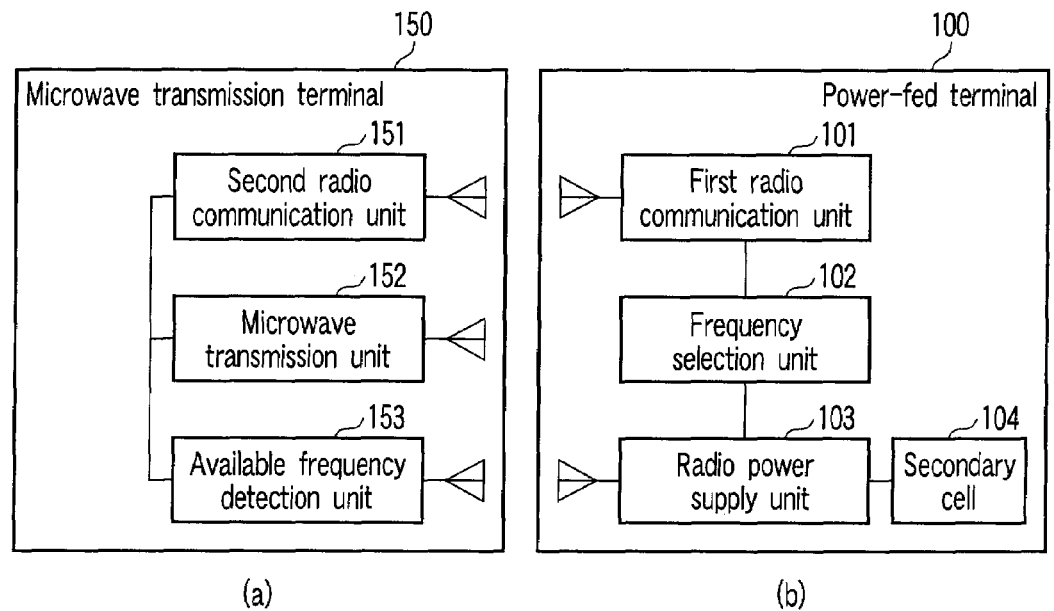
FIG. 1 is a block diagram of a power-fed terminal and a microwave transmission terminal included in a radio power supply system according to the first embodiment.

A radio power-fed terminal, system, and program according to the embodiments will now be described with reference to the accompanying drawing. In the following embodiments, the same reference numerals denote parts that perform the same operations, and a description thereof will not be repeated.

According to the radio power-fed terminal, system, and program of the present invention, it is possible to perform radio power supply using a frequency optimum for radio power supply.

First Embodiment

A radio power supply system according to this embodiment will be described with reference to FIG. 1.

The radio power supply system according to the embodiment includes a power-fed terminal 100 and a microwave transmission terminal 150.

The power-fed terminal 100 includes a first radio communication unit 101, frequency selection unit 102, radio power supply unit 103, and secondary cell 104. The microwave transmission terminal 150 includes a second radio communication unit 151, microwave transmission unit 152, and available frequency detection unit 153.

The first radio communication unit 101 can transmit/receive information to/from the microwave transmission terminal 150. The first radio communication unit 101 can transmit information to the microwave transmission terminal 150. The first radio communication unit 101 performs radio communication using a specific frequency to transmit/receive information. Any method is usable for it. The first radio communication unit 101 is designed to be able to perform radio communication using a radio communication method such as wireless LAN, Bluetooth®, or portable phone. That is, the first radio communication unit 101 and second radio communication unit 151 transmit/receive information between the microwave transmission terminal 150 and the power-fed terminal 100. Since information can be transmitted/received, it is possible to transmit/receive information about a radio power supply request from the power-fed terminal 100 or the frequency of a microwave to be transmitted for radio power supply.

The frequency selection unit 102 receives the information of the frequency of microwave transmission from the first radio communication unit 101. The frequency selection unit 102 also receives the information of a measured radio power supply amount from the radio power supply unit 103. The frequency selection unit 102 selects a frequency capable of maximum radio power supply based on the frequency information and the radio power supply amount information.

The radio power supply unit 103 converts a received microwave energy into a DC energy and supplies it to the secondary cell 104. Details will be described later with reference to FIG. 2.

The secondary cell 104 converts the DC energy obtained from the radio power supply unit 103 into a chemical energy and stores it. The secondary cell 104 can extract the energy again as an electromotive force, as needed.

The second radio communication unit 151 can transmit/receive information to/from the power-fed terminal 100. The second radio communication unit 151 can transmit information to the power-fed terminal 100. The second radio communication unit 151 is designed to perform radio communication with the first radio communication unit 101, like the first radio communication unit 101.

The microwave transmission unit 152 transmits a microwave to the power-fed terminal 100. The microwave transmission unit 152 is designed to be able to transmit microwaves of various frequencies. The microwave transmission unit 152 includes, e.g., an antenna, microwave transmitter, and amplifier.

The available frequency detection unit 153 detects whether a frequency as a candidate for microwave transmission is being used. Details will be described later with reference to FIG. 3.

The antenna need only be operable at a plurality of frequencies. The antenna may be a broadband antenna such as a horn antenna or spiral antenna, or a tunable antenna formed by integrating an antenna with a variable impedance.

Figure 2:
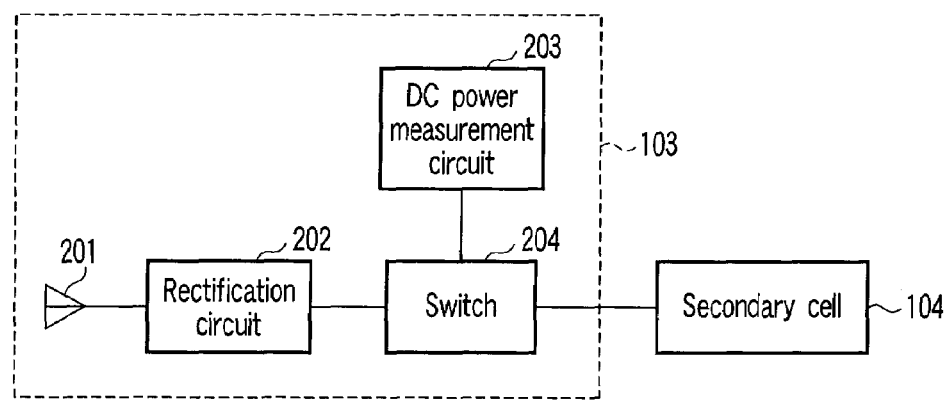
FIG. 2 is a block diagram of a radio power supply unit 103 (including a secondary cell) included in the power-fed terminal in FIG. 1.

The radio power supply unit 103 in FIG. 1 will be described next with reference to FIG. 2.

The radio power supply unit 103 includes a microwave reception antenna 201, rectifying circuit 202, DC power measuring circuit 203, and switch 204.

The microwave reception antenna 201 is the same as described above.

The rectifying circuit 202 converts a microwave received by the microwave reception antenna 201 into a DC current.

The DC power measuring circuit 203 measures the power of the DC current rectified by the rectifying circuit 202. The DC power measuring circuit 203 measures the radio power supply amount using the measured DC power amount.

The switch 204 switches the connection destination of the DC current rectified by the rectifying circuit 202 between the DC power measuring circuit 203 and the secondary cell 104.

This arrangement allows to measure the suppliable power amount when the rectifying circuit 202 is connected to the DC power measuring circuit 203. When the rectifying circuit 202 is connected to the secondary cell 104, power supply to the secondary cell 104 is possible.

Evaluation of the suppliable amount by this arrangement allows to accurately measure the suppliable power amount. The effect will be described later in detail.

Figure 3:
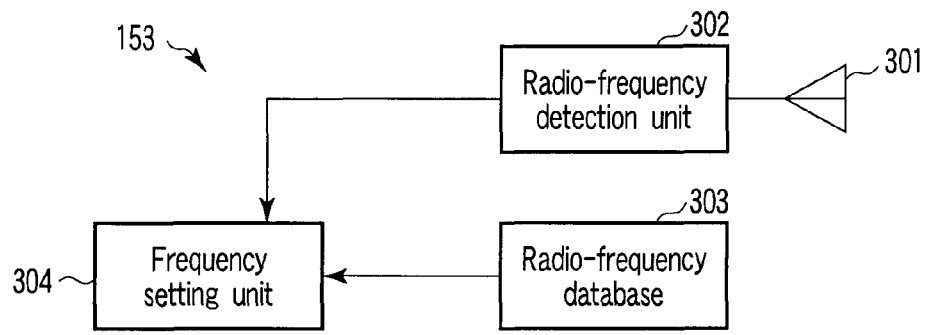
FIG. 3 is a block diagram of an available frequency detection unit included in the microwave transmission terminal in FIG. 1.

The available frequency detection unit 153 in FIG. 1 will be described next with reference to FIG. 3.

The available frequency detection unit 153 includes an available frequency detection antenna 301, radio frequency detection unit 302, radio frequency database 303, and frequency setting unit 304.

The available frequency detection antenna 301 is an antenna capable of receiving microwaves of a plurality of frequencies.

The radio frequency detection unit 302 detects a signal of a wireless system at a given frequency and determines whether the signal exists at the frequency.

The radio frequency database 303 stores the data of already assigned radio frequencies and data representing the correspondence between a frequency and a wireless system that is using the frequency.

The frequency setting unit 304 selects and sets one or a plurality of frequencies which are not being used by any other communication systems and are available for radio power supply. As a characteristic feature, the frequency setting unit 304 compares the frequency detected by the radio frequency detection unit 302 with the radio frequency database 303 and sets a plurality of frequencies available for radio power supply.

This arrangement allows to detect one or more available frequencies and detect a frequency capable of radio power supply without interference with radio communication.

The radio power supply system having the above arrangement performs radio power supply in accordance with the following procedure.

First, the available frequency detection unit 153 detects one or a plurality of available frequencies.

Second, the microwave transmission unit 152 transmits a microwave using the detected available frequency. The radio power supply unit 103 measures the power supply amount at this time.

Third, the frequency selection unit 102 selects a frequency optimum for microwave transmission from the measurement values of the radio power supply amount.

Fourth, the microwave transmission unit 152 transmits a microwave using the optimum frequency. The radio power supply unit 103 supplies power to the secondary cell.

This arrangement allows to perform efficient radio power supply using an optimum frequency.

The difference between the power measuring method of this embodiment and the conventional method will be described. A cognitive radio communication system which performs radio communication using an available frequency will be exemplified here.

There is conventionally an example in which power is measured to survey the received-signal strength indication (RSSI) for communication. In this case, a reception signal received by an antenna is branched by a coupler. One of the branched reception signals is output to a radio communication unit while the other reception signal is output to a rectifying circuit. The rectifying circuit converts the signal into a DC current. A DC power measuring circuit measures the power of the DC current. A frequency selection circuit selects a frequency corresponding to the maximum reception power based on the measured DC power value and the transmitted frequency information obtained from the radio communication circuit.

That is, the conventional radio communication system also measures the DC power, through it measures weak power after branched by the coupler. For this reason, the frequency characteristic of the rectifying circuit of the radio power supply unit 103 which handles large power and that of the conventional rectifying circuit which measures weak power may be different. The conventional method cannot accurately measure the power amount suppliable to the secondary cell.

In this embodiment, the DC power is measured using the rectifying circuit to be used for power supply to the secondary cell. In this embodiment, it is therefore possible to accurately measure the power amount to be supplied to the secondary cell.

More Detailed Example

Figure 4:
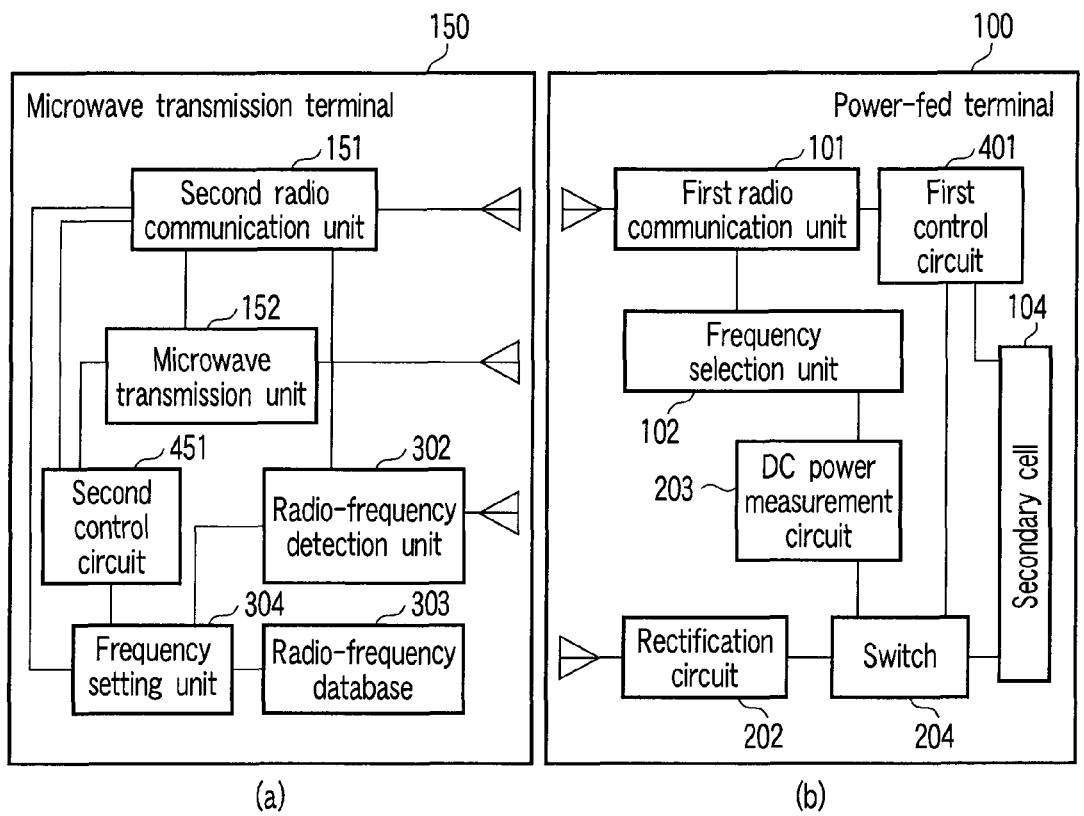
FIG. 4 is a block diagram more specifically showing the power-fed terminal and the microwave transmission terminal included in the radio power supply system according to the first embodiment.

A detailed example of the radio power supply system of the embodiment will be described with reference to FIG. 4.

In this example, the power-fed terminal 100 and the microwave transmission terminal 150 include a first control circuit 401 and a second control circuit 451, respectively, to enable radio power supply for a long time using an optimum frequency. This example is the same as the radio power supply system shown in FIG. 1 except that the first control circuit 401 and second control circuit 451 are added to the radio power supply system in FIG. 1.

In setting an optimum frequency, the second control circuit 451 in the microwave transmission terminal 150 sets the frequency of the microwave transmission unit 152. When performing radio power supply using the optimum frequency, the second control circuit 451 performs setting to transmit a microwave using the optimum frequency.

In setting an optimum frequency, the first control circuit 401 in the power-fed terminal 100 changes over the switch to connect the rectifying circuit 202 to the DC power measuring circuit 203. When performing radio power supply using the optimum frequency, the first control circuit 401 changes over the switch to connect the rectifying circuit 202 to the secondary cell 104.

Figure 5:
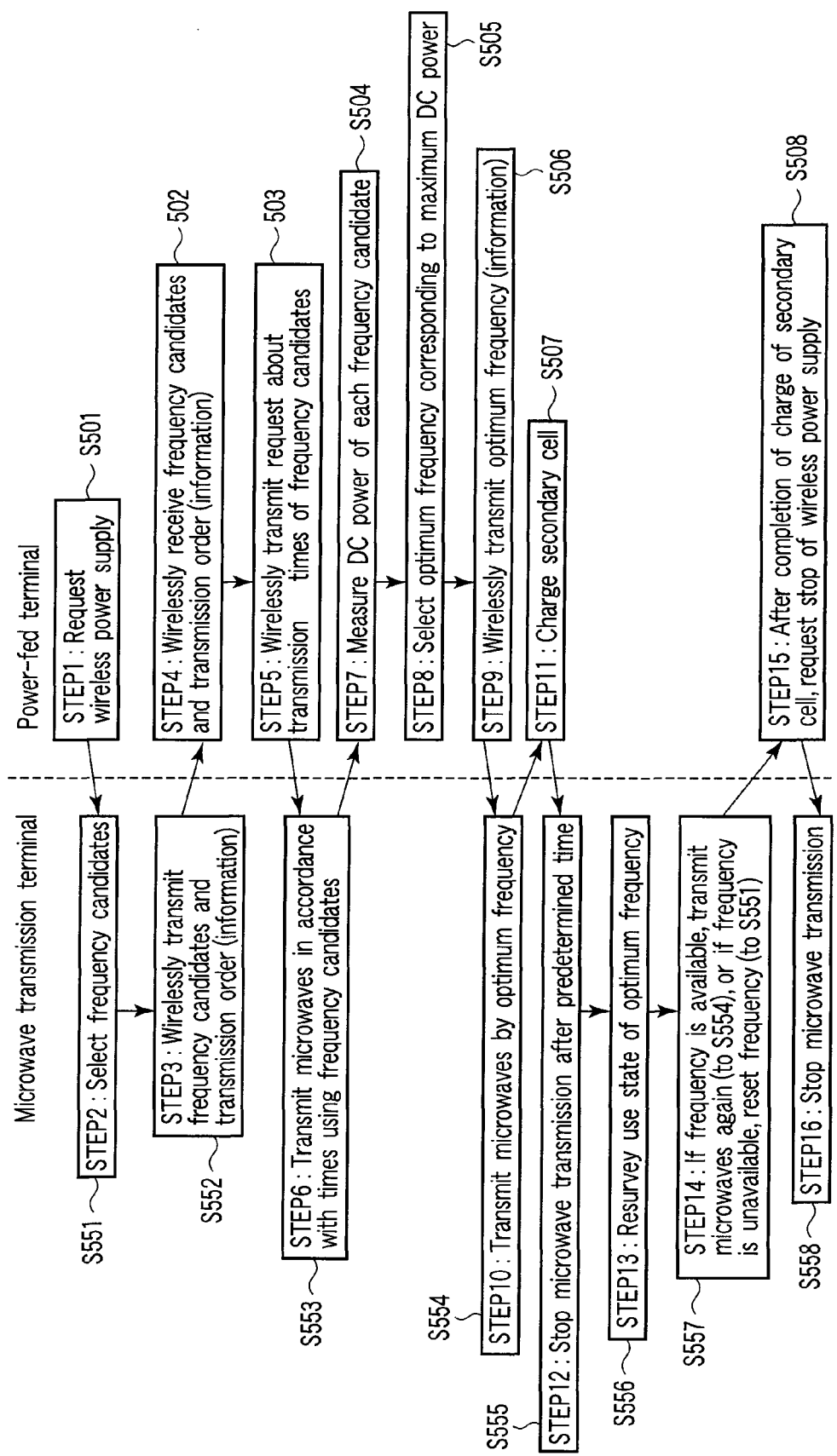
FIG. 5 is a flowchart illustrating an example of the operation of the radio power supply system in FIG. 4.

An example of the operation of the radio power supply system shown in FIG. 4 will be described next with reference to FIG. 5. The left side of FIG. 5 illustrates a procedure to be executed by the microwave transmission terminal 150, whereas the right side illustrates a procedure to be executed by the power-fed terminal 100. In the power-fed terminal 100, the first control circuit 401 controls the operation. In the microwave transmission terminal 150, the second control circuit 451 controls the operation.

STEP 1: In the power-fed terminal 100, the first radio communication unit 101 sends a radio power supply request to the microwave transmission terminal 150 under the control of the first control circuit 401 (step S501).

STEP 2: In the microwave transmission terminal 150, the second control circuit 451 detects that the second radio communication unit 151 has received the radio power supply request from the power-fed terminal 100. The second control circuit 451 issues an instruction to the frequency setting unit 304 to select frequency candidates so that the frequency setting unit 304 selects frequency candidates (S551).

STEP 3: In the microwave transmission terminal 150, the second radio communication unit 151 wirelessly transmits, to the power-fed terminal 100, the candidate frequencies selected by the frequency setting unit 304 and information about the transmission order set by the second control circuit 451 (step S552).

STEP 4: In the power-fed terminal 100, the first radio communication unit 101 wirelessly receives the candidate frequencies and the information about the transmission order from the microwave transmission terminal 150 (step S502).

STEP 5: In the power-fed terminal 100, the first radio communication unit 101 wirelessly transmits a request associated with the transmission times of the candidate frequencies (step S503).

STEP 6: In the microwave transmission terminal 150, the microwave transmission unit 152 transmits microwaves in accordance with the transmission times received from the power-fed terminal 100 (step S553).

STEP 7: In the power-fed terminal 100, the first control circuit 401 connects the switch 204 to the DC power measuring circuit 203 so that the DC power measuring circuit 203 measures the DC power for each candidate frequency (step S504).

STEP 8: In the power-fed terminal 100, the frequency selection unit 102 selects, as an optimum frequency, a frequency at which the maximum DC power is obtained (step S505).

STEP 9: In the power-fed terminal 100, the first radio communication unit 101 wirelessly transmits information about the optimum frequency selected in step S505 to the microwave transmission terminal 150 (step S506).

STEP 10: In the microwave transmission terminal 150, the second control circuit 451 transfers, to the microwave transmission unit 152, an instruction to transmit a microwave using the optimum frequency in accordance with the optimum frequency information which the second radio communication unit 151 has received from the power-fed terminal 100. The microwave transmission unit 152 transmits a microwave to the power-fed terminal 100 (step S554).

STEP 11: In the power-fed terminal 100, the first control circuit 401 connects the switch 204 to the secondary cell 104 to supply a current obtained by the rectifying circuit 202 to the switch 204 (step S507).

STEP 12: In the microwave transmission terminal 150, the second control circuit 451 instructs the microwave transmission unit 152 to stop microwave transmission after a predetermined time. The microwave transmission unit 152 stops microwave transmission (step S555).

STEP 13: In the microwave transmission terminal 150, the second control circuit 451 instructs the frequency setting unit 304 to cause the radio frequency detection unit 302 to check the vacant state by surveying whether another radio communication system is using the optimum frequency selected in step S505. The frequency setting unit 304 executes the resurvey (step S556).

STEP 14: In the microwave transmission terminal 150, if the result of resurvey in step S556 indicates that the frequency is continuously free, microwave transmission in STEP 10 (step S554) is resumed (step S557). If the result of resurvey in step S556 indicates that the optimum frequency is not available, the second control circuit 451 controls the units of the microwave transmission terminal 150 to perform available frequency candidate selection in STEP 2 (step S551) again (step S557).

STEP 15: In the power-fed terminal 100, when the first control circuit 401 detects that charge of the secondary cell 104 is completed, the first control circuit 401 controls the first radio communication unit 101 to wirelessly transmit a radio power supply stop request to the microwave transmission terminal 150. The first radio communication unit 101 performs the radio communication (step S508).

STEP 16: In the microwave transmission terminal 150, upon determining that the second radio communication unit 151 has received the radio power supply stop request, the second control circuit 451 transfers an instruction to the microwave transmission unit 152 to stop microwave transmission. The microwave transmission unit 152 stops microwave transmission (step S558).

It is possible to perform radio power supply for a long time using an optimum frequency by performing radio power supply according to the above-described procedure. As a result, power supply to the secondary cell can be done sufficiently. It is also possible to minimize interference with another radio communication system even in radio power supply for a long time.

According to the above-described first embodiment, it is possible to appropriately select, from available frequencies, a frequency capable of maximizing the power amount suppliable to the secondary cell. It is also possible to perform maximum radio power supply while minimizing interference with another radio communication system.

In this embodiment, the radio communication antenna and the radio power supply antenna in the power-fed terminal are separated. However, they may be integrated for common use. In this case, the size can be reduced. The radio communication antenna, the microwave transmission antenna, and the available frequency detection antenna in the microwave transmission terminal are also separated. However, they may be integrated for common use.

Elements other than the antennas may also be integrated for common use to reduce the size and cost.

Three examples of the antenna used in the rectifying circuit 202 of the power-fed terminal 100 and in the microwave transmission unit 152 of the microwave transmission terminal 150 will be described below with reference to FIGS. 6, 7, and 8.

First Example

Figure 6:
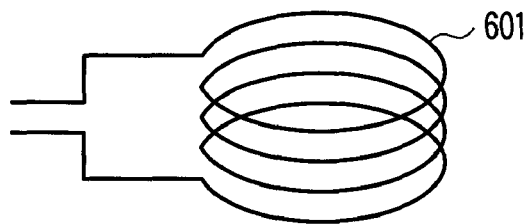
FIG. 6 is a view showing the first example of an antenna used by the radio power supply unit and the microwave transmission unit in FIG. 1.

In the first example, the antenna of each of the rectifying circuit 202 and microwave transmission unit 152 is formed from a coil (FIG. 6). Since the antenna is formed from a coil, radio power supply can be done using an electromagnetic induction method.

In a known radio power supply method using a microwave, coils serving as transmission and reception antennas are made to face each other, and radio power supply is done using electromagnetic induction coupling. In the first example, the antennas are formed from coils to perform radio power supply using electromagnetic induction.

The first example enables radio power supply using electromagnetic induction by forming the antennas from coils.

Second Example

Figure 7:
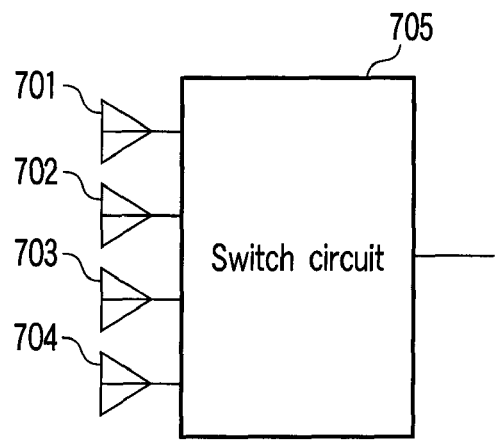
FIG. 7 is a view showing the second example of the antenna used by the radio power supply unit and the microwave transmission unit in FIG. 1.

In the second example, the antenna of each of the rectifying circuit 202 and microwave transmission unit 152 has the same resonance frequency (FIG. 7). This enables resonance radio power supply.

As a radio power supply method using a microwave, a resonance-type method is known in which the antenna on the microwave transmission side and that on the microwave reception side have the same resonance frequency, and resonance is caused in the two antennas to do radio power supply. In the resonance-type method, the antennas need to have the same resonance frequency. The antennas having the same resonance frequency enable efficient radio power supply.

In this embodiment, various frequencies are used. Hence, the second example uses an antenna capable of causing resonance at various frequencies. For example, to cause resonance at various frequencies, antennas that resonate at different frequencies are switched. FIG. 7 shows an antenna arrangement for causing a switch circuit 705 to select one of antennas 701, 702, 703, and 704 that resonate at different frequencies. FIG. 7 shows four antennas. The switch circuit 705 selects an antenna in accordance with a frequency used for microwave transmission.

Third Example

Figure 8:
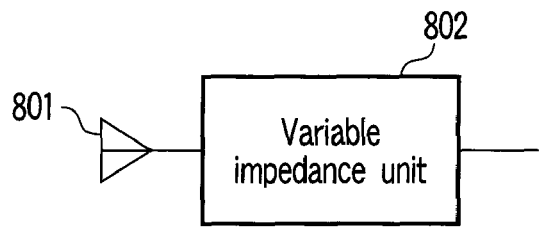
FIG. 8 is a view showing the third example of the antenna used by the radio power supply unit and the microwave transmission unit in FIG. 1.

The third example is almost the same as the second example and uses a tunable antenna formed by combining an antenna 801 and a variable impedance unit 802 (FIG. 8). The variable impedance circuit 802 is formed by combining one or more variable inductances, variable capacitances, and variable resistances. The variable impedance unit 802 can change the resonance frequency of the antenna 801 by changing the value of the variable impedance.

As a characteristic feature of the second and third examples, the microwave reception antenna (connected to the rectifying circuit 202) and the antenna used in the microwave transmission unit 152 of this embodiment have the same resonance frequency, thereby enabling resonance-type radio power supply.

Second Embodiment

Figure 9:
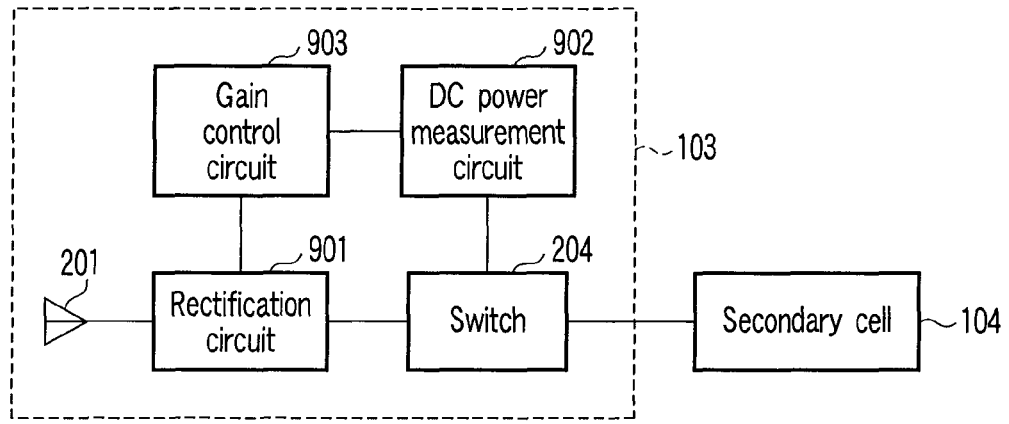
FIG. 9 is a block diagram of the radio power supply unit of a power-fed terminal included in a radio power supply system according to the second embodiment.

The second embodiment is different from the first embodiment in the device portion included in a radio power supply unit 103. In the second embodiment, a gain control circuit 903 is added to the radio power supply unit 103 shown in FIG. 2 of the first embodiment, as shown in FIG. 9, so that a rectifying circuit 901 can switch between two states: a low gain state and a high gain state.

The radio power supply unit 103 of this embodiment includes the rectifying circuit 901, a DC power measuring circuit 902, the gain control circuit 903, and a switch 204.

The rectifying circuit 901 can switch between two states, i.e., a low gain state and a high gain state, and in each case, converts a microwave received by a microwave reception antenna 201 into a DC current. A low gain indicates a low conversion efficiency to a DC current, and a high gain indicates a high conversion efficiency. In the high gain state, it is possible to raise the conversion efficiency from a microwave to a DC current as compared to the low gain state. That is, the radio power supply amount can be increased. In the high gain state, however, since the rectifying circuit 901 operates, the magnitude of power to be externally supplied to the rectifying circuit 901 must be larger than in the low gain state.

The DC power measuring circuit 902 measures the power of the DC current rectified by the rectifying circuit 901 and transfers the measured power value to the gain control circuit 903. The DC power measuring circuit 902 measures the radio power supply amount using the measured DC power amount.

The gain control circuit 903 changes the gain of the rectifying circuit 901 in supplying the DC current to a secondary cell 104 in accordance with the measurement value from the DC power measuring circuit 902 corresponding to the low gain state of the rectifying circuit 901. The remaining components are the same as in the first embodiment, and a description thereof will not be repeated. If the current value measured by the DC power measuring circuit 902 in the low gain state is larger than a threshold value, the gain control circuit 903 switches the rectifying circuit 901 to the high gain state. If the current value measured by the DC power measuring circuit 902 in the low gain state is equal to or smaller than the threshold value, the gain control circuit 903 maintains the low gain state.

In this embodiment, the rectifying circuit 901 can switch between two states, i.e., a low gain state and a high gain state. In the high gain state, it is possible to raise the conversion efficiency from a microwave to a DC current as compared to the low gain state. That is, the radio power supply amount can be increased.

However, to set the high gain state, power supply to the rectifying circuit 901 is necessary. If the difference (P1−P2) between power P1 suppliable by radio power supply and power P2 consumed by the rectifying circuit 901 in the high gain state has a negative value, the power amount in a power-fed terminal 100 decreases even when radio power supply is performed. That is, the actual power supply amount in the high gain state is (P1−P2).

The value of P2 can be measured in advance by the arrangement of the rectifying circuit 901. The value of P1 can be obtained from the value of power P3 suppliable in the low gain state of the rectifying circuit 901. The value of P3 and the strength of the microwave received by the microwave reception antenna 201 have a one-to-one relationship. The microwave strength and the value of P3 can also be obtained in advance because they have a one-to-one relationship.

In this embodiment, (P1−P2)>P3 is used as the reference for gain switching. When (P1−P2)<P3, the actual power supply amount decreases even in the high gain state, and therefore, the rectifying circuit 901 sets the low gain state. That is, the gain control circuit 903 switches the gain using (P1−P2−P3) as the threshold value. When (P1−P2−P3)>0, the gain control circuit 903 switches the rectifying circuit 901 to the high gain state. When (P1−P2−P3)≦0, the gain control circuit 903 switches the rectifying circuit 901 to the low gain state.

According to the second embodiment, the gain of the rectifying circuit 901 to be used for radio power supply is switched depending on whether the value measured by the DC power measuring circuit in the low gain state of the rectifying circuit is larger than the threshold value. When the strength of the microwave received by the microwave reception antenna is high, the high gain state is set to improve the radio power supply amount. When the strength of the microwave is low, the low gain state is set to enable radio power supply while suppressing wasteful power consumption.

Third Embodiment

Figure 10:
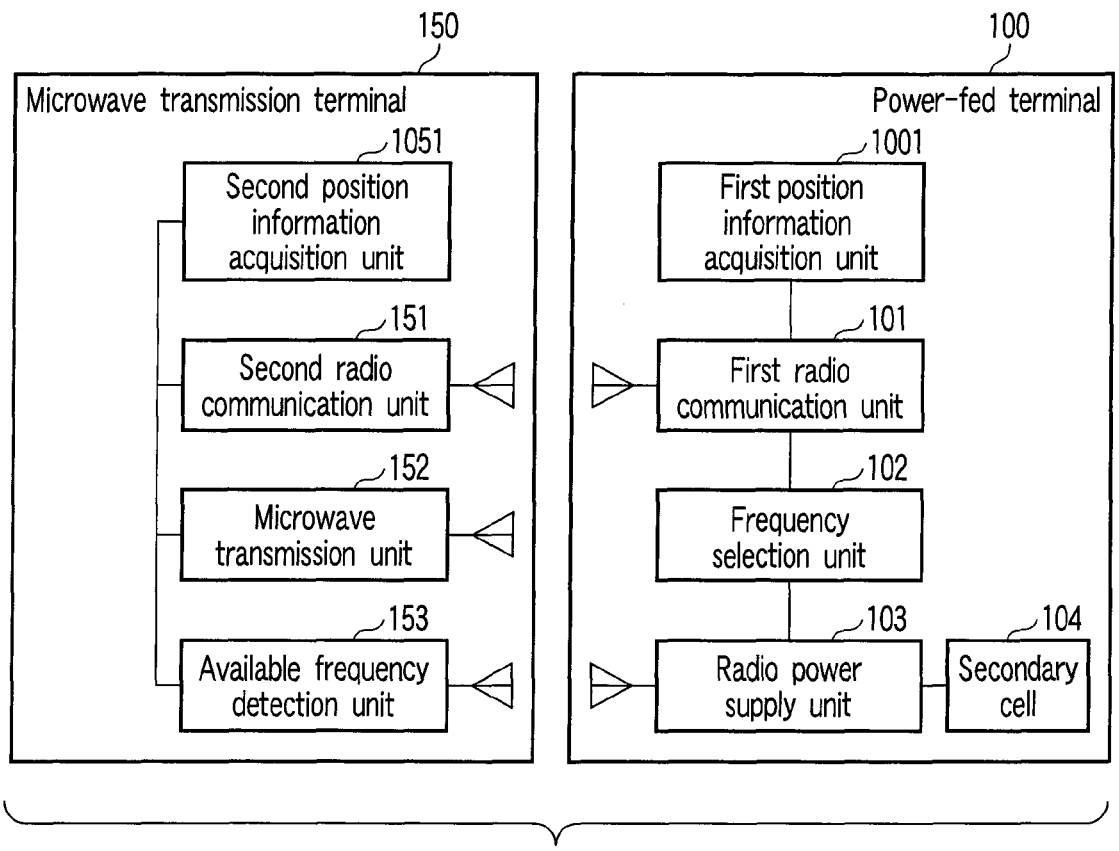
FIG. 10 is a block diagram of a power-fed terminal and a microwave transmission terminal included in a radio power supply system according to the third embodiment.

The third embodiment is different from the first embodiment in that each of a power-fed terminal 100 and a microwave transmission terminal 150 includes a position information acquisition unit, as shown in FIG. 10.

The power-fed terminal 100 includes a first position information acquisition unit 1001. The microwave transmission terminal 150 includes a second position information acquisition unit 1051. As a characteristic feature of the radio power supply system of this embodiment, the first position information acquisition unit 1001 and the second position information acquisition unit 1051 exchange information. Only when the distance between the power-fed terminal 100 and the microwave transmission terminal 150 is smaller than a threshold value, radio power supply is performed.

More specifically, a first radio communication unit 101 in the power-fed terminal 100 acquires second position information acquired by the microwave transmission terminal 150.

Based on the second position information and first position information acquired by the first position information acquisition unit 1001, a first control circuit 401 compares the distance between the power-fed terminal 100 and the microwave transmission terminal 150 with a threshold value and determines whether the distance is smaller than the threshold value. This operation may be done in the microwave transmission terminal 150.

Radio power supply is performed only when the distance between the power-fed terminal 100 and the microwave transmission terminal 150 is smaller than the threshold value. If the distance between the terminals is large, and the radio power supply amount is expected to be very small, radio power supply is not performed. When the radio power supply amount is very small, the transmission power of a microwave is mostly wasted as a loss. According to this embodiment, it is possible to reduce the wasteful power loss.

The first position information acquisition unit 1001 and second position information acquisition unit 1051 use a GPS. When the terminal (normally, the microwave transmission terminal 150) is fixed, position information is input to the corresponding position information acquisition unit in advance.

According to the third embodiment, a position information acquisition unit is added to each of the power-fed terminal and microwave transmission terminal to clarify the distance between them, and whether to perform radio power supply or not can be switched based on the distance. This makes it possible to reduce wasteful power consumption when the radio power supply amount is very small.

According to the above-described embodiment, it is possible to appropriately select, from available frequencies, a frequency capable of maximizing the power amount suppliable to the secondary cell and perform maximum radio power supply using the frequency while minimizing interference with another radio communication system.

In this embodiment, the radio communication antenna and the radio power supply antenna in the power-fed terminal are separated. However, they may be integrated for common use. In this case, the size can be reduced. The radio communication antenna, the microwave transmission antenna, and the available frequency detection antenna in the microwave transmission terminal are separated. However, they may be integrated for common use.

Elements other than the antennas may also be integrated for common use to reduce the size and cost.

It is also possible to implement an arrangement for dealing with a plurality of frequencies, improvement of the radio power supply amount, reduction of cost and power consumption, and coexistence of radio communication and radio power supply.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power-fed terminal comprising:
a first reception unit configured to receive, from another terminal, first information containing at least one frequency candidate that fails to be used by any other communication system, the frequency candidate being used for transmitting a first microwave;
a second reception unit configured to receive the first microwave transmitted by the another terminal using the frequency candidate;
a conversion unit configured to convert an energy of the first microwave into a first DC energy; and
a transmission unit configured to transmit, to the another terminal, second information containing an optimum frequency corresponding to a maximum energy of the first DC energy,
wherein the second reception unit is configured to receive a second microwave transmitted based on the second information by the another terminal, the conversion unit is configured to convert an energy of the second microwave into a second DC energy,
the terminal further comprising a secondary cell acquiring the second DC energy at the optimum frequency.

2. The terminal according to claim 1, wherein the second reception unit includes a microwave reception antenna, and the conversion unit includes:
a rectifying circuit converting the microwave received by the microwave reception antenna into a DC current;
a measuring unit configured to measure a current value of the DC current for each frequency candidate to obtain a plurality of measured current values;
a selection unit configured to select an optimum frequency corresponding to a maximum current value of the measured current values from the frequency candidate; and
a switch configured to switch a connection destination of the DC current between the measuring unit and the secondary cell.

3. The terminal according to claim 2, wherein the rectifying circuit has two states including a high gain state and a low gain state, if the measured current value in the low gain state is more than a threshold value, the rectifying circuit is switched to the high gain state, and if the measured current value in the low gain state is not more than the threshold value, the rectifying circuit maintains the low gain state.

4. The terminal according to claim 1, further comprising an acquisition unit configured to acquire first position information of self-terminal, and
wherein the first reception unit receives second position information of the another terminal, and the power-fed terminal further comprises a controller computing a distance between the self-terminal and the another terminal based on the first position information and the second position information, and operating the conversion unit and the transmission unit only if the distance is smaller than a threshold value.

5. The terminal according to claim 1, wherein the second reception unit receives, via an antenna formed of a coil, a microwave transmitted via an antenna formed of a coil.

6. The terminal according to claim 1, wherein the second reception unit receives, via an antenna having a resonance frequency, a microwave transmitted via an antenna having the resonance frequency.

7. A power-fed terminal comprising:
a first reception unit configured to receive, from another terminal, first information containing at least one frequency candidate that fails to be used by any other communication system, the frequency candidate being used for transmitting a first microwave;
a second reception unit configured to receive the first microwave transmitted by the another terminal using the frequency candidate;
a conversion unit configured to convert an energy of the first microwave into a first DC current;

a measuring unit configured to measure a current value of the first DC current for each frequency candidate to obtain a plurality of measured current values;

a selection unit configured to select an optimum frequency corresponding to a maximum current value of the measured current values from the at least one frequency candidate; and a transmission unit configured to transmit second information containing the optimum frequency to the another terminal, wherein the second reception unit is configured to receive a second microwave transmitted based on the second information by the another terminal, the conversion unit is configured to convert an energy of the second microwave into a second DC energy, the terminal further comprising a secondary cell acquiring the second DC current at the optimum frequency.

8. A radio power supply system including a first terminal which requests another terminal to supply power, and a second terminal which receives the request from the first terminal and transmits a microwave to the first terminal, the second terminal comprising:

a first selection unit configured to select at least one frequency candidate that fails to be used by any other communication system, the frequency candidate being used for transmitting a first microwave;

a first transmission unit configured to transmit first information containing the frequency candidate to the first terminal; and a second transmission unit configured to transmit the first microwave to the first terminal by using the frequency candidate, the first terminal comprising:

a first reception unit configured to receive the first information;

a second reception unit configured to receive the first microwave using the frequency candidate contained in the first information;

a conversion unit configured to convert the first microwave into a first DC current;

a measuring unit configured to measure a current value of the first DC current for each frequency candidate to obtain a plurality of measured current values;

a second selection unit configured to select an optimum frequency corresponding to a maximum current value of the measured current values from the at least one frequency candidate; and a third transmission unit configured to transmit second information containing the optimum frequency to the second terminal, the second terminal further comprising a third reception unit configured to receive the second information, wherein the second transmission unit is configured to transmit a second microwave to the first terminal by using the optimum frequency contained in the second information, the second reception unit is configured to receive the second microwave, the conversion unit is configured to convert an energy of the second microwave into a second DC energy, the first terminal further comprising a secondary cell acquiring the second DC current at the optimum frequency.

9. The system according to claim 8, wherein the first selection unit comprises:

an antenna receiving a plurality of microwaves of frequencies;

a determination unit configured to determine, using a signal received via the antenna, whether a signal used in a first communication system exists at a frequency;

a storage unit configured to store information about a second communication system that is already used and a frequency used by the second communication system; and a third selection unit configured to select, from frequencies which fails to be used by any other communication system and are included in the storage unit, at least one frequency candidate for which the determination unit determines that no signal by a communication system exists.

10. The system according to claim 8, wherein the first terminal further comprises a first acquisition unit configured to acquire first position information of the first terminal, the second terminal further comprises a second acquisition unit configured to acquire second position information of the second terminal, the first reception unit receives the second position information, and the first terminal further comprises a controller computing a distance between the first terminal and the second terminal based on the first position information and the second position information, and operating the conversion unit, the measuring unit, the second selection unit, and the third transmission unit only if the distance is smaller than a threshold value.

11. The system according to claim 8, wherein the second transmission unit transmits the first microwave via an antenna formed of a coil, and the second reception unit receives the first microwave via an antenna formed of a coil.

12. The system according to any one of claim 8, wherein the second transmission unit transmits the first microwave via an antenna having a resonance frequency, and the second reception unit receives the first microwave via an antenna having the resonance frequency.

13. A radio power supply method comprising:

receiving, from another terminal, first information containing at least one frequency candidate that fails to be used by any other communication system, the frequency candidate being used for transmitting a first microwave;

receiving the first microwave transmitted by the another terminal using the frequency candidate;

converting an energy of the first microwave into a first DC energy;

transmitting, to the another terminal, second information containing an optimum frequency corresponding to a maximum energy of the first DC energy;

receiving a second microwave transmitted based on the second information by the another terminal;

converting an energy of the second microwave into a second DC energy; and preparing a secondary cell acquiring the second DC energy at the optimum frequency.

14. A radio power supply method in a radio power supply system including a first terminal which requests another terminal to supply power, and a second terminal which receives the request from the first terminal and transmits a microwave to the first terminal, comprising:

in the second terminal:

selecting at least one frequency candidate that fails to be used by any other communication system, the frequency candidate being used for transmitting a first microwave;

transmitting first information containing the frequency candidate to the first terminal; and transmitting the first microwave to the first terminal by using the frequency candidate, in the first terminal:

receiving the first information;

receiving the first microwave using the frequency candidate contained in the first information;

converting the first microwave into a first DC current;

measuring a current value of the first DC current for each frequency candidate to obtain a plurality of measured current values;

selecting an optimum frequency corresponding to a maximum current value of the measured current values from the at least one frequency candidate; and transmitting second information containing the optimum frequency to the second terminal, in the second terminal, further comprising:

receiving the second information; and transmitting a second microwave to the first terminal by using the optimum frequency contained in the second information, and in the first terminal, further comprising:

receiving the second microwave;

converting an energy of the second microwave into a second DC energy; and preparing a secondary cell acquiring the second DC current at the optimum frequency.

* * * * *